United States Patent
Guirguis et al.

(10) Patent No.: US 10,691,722 B2
(45) Date of Patent: Jun. 23, 2020

(54) CONSISTENT QUERY EXECUTION FOR BIG DATA ANALYTICS IN A HYBRID DATABASE

(71) Applicant: Oracle International Corporation, Redwood Shores, CA (US)

(72) Inventors: Shenoda Guirguis, San Jose, CA (US); Kantikiran Pasupuleti, Foster City, CA (US); Sabina Petride, Tracy, CA (US); Sam Idicula, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 423 days.

(21) Appl. No.: 15/610,171

(22) Filed: May 31, 2017

(65) Prior Publication Data

US 2018/0349458 A1    Dec. 6, 2018

(51) Int. Cl.
*G06F 16/27* (2019.01)
*G06F 16/23* (2019.01)
*G06F 16/2455* (2019.01)

(52) U.S. Cl.
CPC ........ *G06F 16/273* (2019.01); *G06F 16/2365* (2019.01); *G06F 16/2379* (2019.01); *G06F 16/2455* (2019.01)

(58) Field of Classification Search
None
See application file for complete search history.

(56) References Cited

U.S. PATENT DOCUMENTS 4,507,751 A    3/1985  Gawlick et al.
4,710,926 A    12/1987 Brown et al.
(Continued)

FOREIGN PATENT DOCUMENTS

EP    0 503 417 A2    9/1992
EP      050180 A      9/1992
(Continued)

OTHER PUBLICATIONS

Yang, U.S. Appl. No. 15/266,375, filed Sep. 15, 2016, Notice of Allowance, dated Apr. 11, 2019.
(Continued)

*Primary Examiner* — Richard L Bowen
(74) *Attorney, Agent, or Firm* — Hickman Palermo Becker Bingham LLP

(57) ABSTRACT

Techniques are described for efficient query processing and data change propagation to a secondary database system. The secondary database system may execute queries received at a primary database system. Database changes made at the primary system are copied to the secondary system. The primary system receives a query to be executed on either the primary system or the secondary system. The primary system determines whether to send the query to the secondary system based upon whether data objects stored within the secondary system have pending changes that need to be applied to the data objects. The pending changes are stored within in-memory journals within the primary system. The primary system scans for the pending changes to the data objects and sends the pending changes to the secondary system. The secondary system then receives and applies the pending changes to the data objects within the secondary system. Upon applying the pending changes, the secondary system executes the query.

20 Claims, 4 Drawing Sheets

(56) References Cited

U.S. PATENT DOCUMENTS

| | | | |
|---|---|---|---|
| 4,782,325 A | 11/1988 | Jeppsson et al. |
| 4,945,474 A | 7/1990 | Elliott et al. |
| 5,095,421 A | 3/1992 | Freund |
| 5,146,571 A | 9/1992 | Logan |
| 5,182,752 A | 1/1993 | DeRoo et al. |
| 5,233,618 A | 8/1993 | Gilder et al. |
| 5,241,675 A | 8/1993 | Sheth et al. |
| 5,263,156 A | 11/1993 | Bowen et al. |
| 5,287,496 A | 2/1994 | Chen et al. |
| 5,327,556 A | 7/1994 | Mohan |
| 5,329,628 A | 7/1994 | Yomamoto et al. |
| 5,333,265 A | 7/1994 | Orimo et al. |
| 5,333,316 A | 7/1994 | Champagne et al. |
| 5,355,477 A | 10/1994 | Strickland et al. |
| 5,369,757 A | 11/1994 | Spiro et al. |
| 5,388,196 A | 2/1995 | Pajak et al. |
| 5,418,940 A | 5/1995 | Mohan |
| 5,423,037 A | 6/1995 | Hvasshovd |
| 5,454,102 A | 9/1995 | Tang et al. |
| 5,487,164 A | 1/1996 | Kirchhofer et al. |
| 5,553,279 A | 9/1996 | Goldring |
| 5,555,404 A | 9/1996 | Torbjørnsen et al. |
| 5,559,991 A | 9/1996 | Kanfi |
| 5,574,906 A | 11/1996 | Morris |
| 5,581,753 A | 12/1996 | Terry et al. |
| 5,581,754 A | 12/1996 | Terry et al. |
| 5,588,012 A | 12/1996 | Oizumi |
| 5,603,024 A | 2/1997 | Goldring |
| 5,613,113 A | 3/1997 | Goldring |
| 5,696,775 A | 12/1997 | Nemazie et al. |
| 5,717,893 A | 2/1998 | Mattson |
| 5,734,898 A | 3/1998 | He |
| 5,742,792 A | 4/1998 | Yanai et al. |
| 5,778,430 A | 7/1998 | Ish et al. |
| 5,805,799 A | 9/1998 | Fredrickson et al. |
| 5,806,076 A | 9/1998 | Ngai et al. |
| 5,870,758 A | 2/1999 | Bamford et al. |
| 5,870,759 A | 2/1999 | Bauer et al. |
| 5,870,763 A | 2/1999 | Lomet |
| 5,893,930 A | 4/1999 | Song |
| 5,924,096 A | 7/1999 | Draper et al. |
| 5,956,731 A | 9/1999 | Bamford et al. |
| 5,960,436 A | 9/1999 | Chang et al. |
| 5,974,427 A | 10/1999 | Reiter |
| 5,983,277 A | 11/1999 | Heile et al. |
| 5,991,771 A | 11/1999 | Falls et al. |
| 6,009,432 A | 12/1999 | Tarin |
| 6,009,542 A | 12/1999 | Koller et al. |
| 6,014,669 A | 1/2000 | Slaughter et al. |
| 6,026,406 A | 2/2000 | Huang et al. |
| 6,044,367 A | 3/2000 | Wolff |
| 6,067,550 A | 5/2000 | Lomet |
| 6,094,708 A | 7/2000 | Hilla et al. |
| 6,098,190 A | 8/2000 | Rust et al. |
| 6,151,607 A | 11/2000 | Lomet |
| 6,192,377 B1 | 2/2001 | Ganesh et al. |
| 6,226,650 B1 | 5/2001 | Mahajan |
| 6,272,500 B1 | 8/2001 | Sugita |
| 6,298,319 B1 | 10/2001 | Heile et al. |
| 6,298,425 B1 | 10/2001 | Whitaker et al. |
| 6,324,661 B1 | 11/2001 | Gerbault et al. |
| 6,353,835 B1 | 3/2002 | Lieuwen |
| 6,393,485 B1 | 5/2002 | Chao et al. |
| 6,438,724 B1 | 8/2002 | Cox et al. |
| 6,446,234 B1 | 9/2002 | Cox et al. |
| 6,449,623 B1 | 9/2002 | Bohannon et al. |
| 6,516,327 B1 | 2/2003 | Zondervan et al. |
| 6,523,032 B1 | 2/2003 | Sunkara |
| 6,535,869 B1 | 3/2003 | Housel, III |
| 6,560,743 B2 | 5/2003 | Plants |
| 6,574,717 B1 | 6/2003 | Ngai et al. |
| 6,691,139 B2 | 2/2004 | Ganesh et al. |
| 6,728,879 B1 | 4/2004 | Atkinson |
| 6,732,125 B1 | 5/2004 | Autrey et al. |
| 6,775,681 B1 | 8/2004 | Ballamkonda |
| 6,804,671 B1 | 10/2004 | Loaiza et al. |
| 6,839,751 B1 | 1/2005 | Dietz et al. |
| 6,886,084 B2 | 4/2005 | Kawashima et al. |
| 6,980,988 B1 | 12/2005 | Demers et al. |
| 7,003,694 B1 | 2/2006 | Anderson, Jr. |
| 7,024,656 B1 | 4/2006 | Ahad |
| 7,076,508 B2 | 7/2006 | Bourbonnais et al. |
| 7,136,970 B2 | 11/2006 | Yoshiya et al. |
| 7,149,769 B2 | 12/2006 | Lubbers et al. |
| 7,149,858 B1 | 12/2006 | Kiselev |
| 7,155,463 B1 | 12/2006 | Wang et al. |
| 7,222,136 B1 | 5/2007 | Brown et al. |
| 7,228,354 B2 | 6/2007 | Chambliss et al. |
| 7,237,027 B1 | 6/2007 | Raccah et al. |
| 7,246,275 B2 | 7/2007 | Therrien et al. |
| 7,257,689 B1 | 8/2007 | Baird |
| 7,287,034 B2 | 10/2007 | Wong et al. |
| 7,290,017 B1 | 10/2007 | Wang et al. |
| 7,363,538 B1 | 4/2008 | Joydip et al. |
| 7,370,068 B1 | 5/2008 | Pham et al. |
| 7,464,113 B1 | 12/2008 | Gikar |
| 7,599,967 B2 | 10/2009 | Girkar et al. |
| 7,600,063 B2 | 10/2009 | Loaiza |
| 7,627,612 B2 | 12/2009 | Ahal et al. |
| 7,627,614 B2 | 12/2009 | Hu et al. |
| 7,644,084 B2 | 1/2010 | Rapp |
| 7,734,580 B2 | 6/2010 | Lahiri et al. |
| 7,761,425 B1 | 7/2010 | Erickson et al. |
| 7,822,717 B2 | 10/2010 | Kappor et al. |
| 7,895,216 B2 | 2/2011 | Longshaw et al. |
| 7,966,293 B1 | 6/2011 | Owara et al. |
| 7,996,363 B2 | 8/2011 | Girkar et al. |
| 8,024,396 B2 | 9/2011 | Seddukhin |
| 8,286,182 B2 | 10/2012 | Chan |
| 8,364,648 B1 | 1/2013 | Sim-Tang |
| 8,433,684 B2 | 4/2013 | Munoz |
| 8,468,320 B1 | 6/2013 | Stringham |
| 8,473,953 B2 | 6/2013 | Bourbonnais |
| 8,478,718 B1 | 7/2013 | Ranade |
| 8,560,879 B1 | 10/2013 | Goel |
| 8,615,578 B2 | 12/2013 | Hu et al. |
| 8,694,733 B2 | 4/2014 | Krishnan et al. |
| 8,832,142 B2 | 9/2014 | Marwah et al. |
| 8,838,919 B2 | 9/2014 | Shi et al. |
| 8,856,484 B2 | 10/2014 | Ben-Tsion et al. |
| 8,868,492 B2 | 10/2014 | Garin et al. |
| 8,868,504 B2 | 10/2014 | Aranna et al. |
| 8,930,312 B1 | 1/2015 | Rath |
| 9,026,679 B1 | 5/2015 | Shmuylovich |
| 9,077,579 B1 | 7/2015 | Chu |
| 9,146,934 B2 | 9/2015 | Hu et al. |
| 9,244,996 B2 | 1/2016 | Bourbonnais |
| 9,767,178 B2 | 9/2017 | Srivastava et al. |
| 2002/0049950 A1 | 4/2002 | Loaiza et al. |
| 2002/0091718 A1 | 7/2002 | Bohannon et al. |
| 2002/0112022 A1 | 8/2002 | Kazar et al. |
| 2002/0133508 A1 | 9/2002 | LaRue et al. |
| 2002/0143755 A1 | 10/2002 | Wynblatt et al. |
| 2002/0165724 A1 | 11/2002 | Blankesteijn |
| 2003/0046396 A1 | 3/2003 | Richter et al. |
| 2003/0061537 A1 | 3/2003 | Cha et al. |
| 2003/0126114 A1 | 7/2003 | Tedesco |
| 2003/0140050 A1 | 7/2003 | Li |
| 2003/0140288 A1 | 7/2003 | Loaiza et al. |
| 2003/0212660 A1 | 11/2003 | Kerwin |
| 2003/0217064 A1 | 11/2003 | Walters |
| 2003/0217071 A1 | 11/2003 | Kobayashi et al. |
| 2004/0003087 A1 | 1/2004 | Chambliss et al. |
| 2004/0062106 A1 | 4/2004 | Ramesh et al. |
| 2004/0193570 A1 | 9/2004 | Yaegar |
| 2004/0267809 A1 | 12/2004 | East et al. |
| 2005/0005083 A1 | 1/2005 | Ozdemir |
| 2005/0038831 A1 | 2/2005 | Souder et al. |
| 2005/0055380 A1 | 3/2005 | Thompson et al. |
| 2005/0120025 A1 | 6/2005 | Rodriguez et al. |
| 2005/0165798 A1 | 7/2005 | Cherkauer et al. |
| 2006/0004691 A1 | 1/2006 | Sifry |
| 2006/0015542 A1 | 1/2006 | Pommerenk |
| 2006/0047713 A1 | 3/2006 | Gornshtein |

(56) References Cited

U.S. PATENT DOCUMENTS

| | | |
|---|---|---|
| 2006/0064405 A1 | 3/2006 | Jiang et al. |
| 2006/0080646 A1 | 4/2006 | Aman |
| 2006/0129595 A1 | 6/2006 | Sankaran |
| 2006/0168585 A1 | 7/2006 | Grcevski |
| 2006/0173833 A1 | 8/2006 | Purcell et al. |
| 2006/0200497 A1 | 9/2006 | Hu et al. |
| 2006/0212481 A1 | 9/2006 | Stacey et al. |
| 2006/0212573 A1 | 9/2006 | Loaiza |
| 2006/0224551 A1 | 10/2006 | Lariba-Pey |
| 2006/0242513 A1 | 10/2006 | Loaiza et al. |
| 2007/0038689 A1 | 2/2007 | Shinkai |
| 2007/0083505 A1 | 4/2007 | Ferrari et al. |
| 2007/0100912 A1 | 5/2007 | Pareek et al. |
| 2007/0156957 A1 | 7/2007 | McHardy et al. |
| 2007/0174292 A1 | 7/2007 | Li et al. |
| 2007/0226277 A1 | 9/2007 | Holenstein et al. |
| 2007/0239680 A1 | 10/2007 | Oztekin et al. |
| 2008/0005112 A1 | 1/2008 | Shavit |
| 2008/0016074 A1 | 1/2008 | Ben-dyke et al. |
| 2008/0059492 A1 | 3/2008 | Tarin |
| 2008/0104283 A1 | 5/2008 | Shin et al. |
| 2008/0126846 A1 | 5/2008 | Vivian et al. |
| 2008/0147599 A1 | 6/2008 | Young-Lai |
| 2008/0162587 A1 | 7/2008 | Auer |
| 2008/0177803 A1 | 7/2008 | Fineberg et al. |
| 2008/0222311 A1 | 9/2008 | Lee |
| 2008/0228835 A1 | 9/2008 | Lashley et al. |
| 2008/0244209 A1 | 10/2008 | Seelam et al. |
| 2008/0256143 A1 | 10/2008 | Reddy et al. |
| 2008/0256250 A1 | 10/2008 | Wakefield et al. |
| 2008/0281784 A1 | 11/2008 | Zane et al. |
| 2008/0281865 A1 | 11/2008 | Price et al. |
| 2009/0024384 A1 | 1/2009 | Kobayashi et al. |
| 2009/0034377 A1 | 2/2009 | English et al. |
| 2009/0063591 A1 | 3/2009 | Betten et al. |
| 2009/0119295 A1 | 5/2009 | Chou et al. |
| 2009/0182746 A1 | 7/2009 | Mittal et al. |
| 2009/0248756 A1 | 10/2009 | Akidau |
| 2009/0268903 A1 | 10/2009 | Bojinov et al. |
| 2009/0307290 A1 | 12/2009 | Barsness et al. |
| 2010/0036843 A1 | 2/2010 | MacNaughton et al. |
| 2010/0082646 A1 | 4/2010 | Meek et al. |
| 2010/0082648 A1 | 4/2010 | Potapov |
| 2010/0122026 A1 | 5/2010 | Umaamageswaran et al. |
| 2010/0145909 A1 | 6/2010 | Ngo |
| 2010/0211577 A1 | 8/2010 | Shimuzu et al. |
| 2010/0235335 A1 | 9/2010 | Heman et al. |
| 2010/0250549 A1 | 9/2010 | Muller et al. |
| 2010/0318495 A1 | 12/2010 | Yan et al. |
| 2010/0318570 A1 | 12/2010 | Narasinghanallur et al. |
| 2011/0004586 A1 | 1/2011 | Cherryholmes et al. |
| 2011/0029569 A1 | 2/2011 | Ganesh et al. |
| 2011/0060724 A1 | 3/2011 | Chan |
| 2011/0066791 A1 | 3/2011 | Goyal et al. |
| 2011/0087633 A1 | 4/2011 | Kreuder et al. |
| 2011/0087637 A1 | 4/2011 | Sundaram et al. |
| 2011/0099179 A1 | 4/2011 | Balebail |
| 2011/0138123 A1 | 6/2011 | Aditya et al. |
| 2011/0145207 A1 | 6/2011 | Agrawal et al. |
| 2011/0231362 A1 | 9/2011 | Attarde et al. |
| 2011/0238655 A1 | 9/2011 | Clorain et al. |
| 2011/0307450 A1 | 12/2011 | Hahn et al. |
| 2012/0054158 A1 | 3/2012 | Hu et al. |
| 2012/0054533 A1 | 3/2012 | Shi et al. |
| 2012/0054546 A1 | 3/2012 | Kampouris |
| 2012/0109926 A1 | 5/2012 | Novik et al. |
| 2012/0173515 A1 | 7/2012 | Jeong et al. |
| 2012/0278282 A1 | 11/2012 | Lu |
| 2012/0284228 A1 | 11/2012 | Ghosh |
| 2012/0323849 A1 | 12/2012 | Garin et al. |
| 2012/0323971 A1 | 12/2012 | Pasupuleti |
| 2013/0085742 A1 | 4/2013 | Baker et al. |
| 2013/0117237 A1 | 5/2013 | Thomsen et al. |
| 2013/0132674 A1 | 5/2013 | Sundrani |
| 2013/0198133 A1 | 8/2013 | Lee |
| 2013/0212068 A1 | 8/2013 | Talius et al. |
| 2014/0040218 A1 | 2/2014 | Kimura et al. |
| 2014/0059020 A1 | 2/2014 | Hu et al. |
| 2014/0075493 A1 | 3/2014 | Krishnan et al. |
| 2014/0095452 A1 | 4/2014 | Lee et al. |
| 2014/0095530 A1 | 4/2014 | Lee et al. |
| 2014/0095546 A1 | 4/2014 | Kruglikov et al. |
| 2014/0164331 A1 | 6/2014 | Li et al. |
| 2014/0258241 A1 | 9/2014 | Chen |
| 2014/0279840 A1 | 9/2014 | Chan et al. |
| 2015/0032694 A1 | 1/2015 | Rajamani et al. |
| 2015/0088811 A1 | 3/2015 | Hase et al. |
| 2015/0088822 A1 | 3/2015 | Raja et al. |
| 2015/0088824 A1 | 3/2015 | Kamp et al. |
| 2015/0088830 A1 | 3/2015 | Kamp |
| 2015/0088926 A1 | 3/2015 | Chavan et al. |
| 2015/0089125 A1 | 3/2015 | Mukherjee et al. |
| 2015/0089134 A1 | 3/2015 | Mukherjee et al. |
| 2015/0120659 A1 | 4/2015 | Srivastava et al. |
| 2015/0120780 A1 | 4/2015 | Jain |
| 2015/0254240 A1 | 9/2015 | Li et al. |
| 2015/0278331 A1* | 10/2015 | Blea .................. G06F 16/27 707/610 |
| 2015/0317183 A1 | 11/2015 | Little |
| 2016/0179867 A1 | 6/2016 | Li et al. |
| 2016/0292167 A1 | 10/2016 | Tran et al. |
| 2017/0116252 A1 | 4/2017 | Krishnaswamy |
| 2017/0116298 A1 | 4/2017 | Ravipati |
| 2018/0046643 A1* | 2/2018 | Brodt .................. G06F 16/178 |
| 2018/0046693 A1* | 2/2018 | Brodt .................. G06F 16/273 |
| 2018/0121511 A1 | 5/2018 | Li |
| 2018/0165324 A1 | 6/2018 | Krishnaswamy |

FOREIGN PATENT DOCUMENTS

| | | |
|---|---|---|
| EP | 2 608 070 A1 | 6/2013 |
| GB | 1 332 631 A | 10/1973 |
| GB | 2505 185 A | 2/2014 |
| JP | 59-081940 | 5/1984 |
| JP | 02-189663 | 7/1990 |
| JP | 08-235032 | 9/1996 |
| JP | 10-040122 | 2/1998 |
| JP | 10-240575 | 9/1998 |
| WO | WO 2007/078444 A1 | 7/2007 |

OTHER PUBLICATIONS

Li, U.S. Appl. No. 15/399,525, filed Oct. 31, 2016, Office Action, dated May 2, 2019.

Li, U.S. Appl. No. 15/339,525, filed Oct. 31, 2016, Office Action, dated May 2, 2019.

Chan, U.S. Appl. No. 13/829,103, filed Mar. 14, 2013, Notice of Allowance, dated Aug. 1, 2018.

Yang, U.S. Appl. No. 15/266,375, filed Sep. 15, 2016, Office Action, dated Nov. 29, 2018.

Teschke, et al., "Concurrent Warehouse Maintenance Without Comprising Session Consistency", 1998, 10 pages.

Vassilakis et al., "Implementation of Transaction and Concurrency Control Support in a Temporal DBMS" Information Systems, vol. 23, No. 5, 1998, 16 pages.

Bober et al., "On Mixing Queries and Transactions Via Multiversion Locking", IEEE, 1992, 11 pages.

Mohan et al., "Efficient and Flexible Methods for Transient Versioning of Records to Avoid Locking by Reading-Only Transactions", XP000393583, IBM Almaden Research Center, Dated Feb. 6, 1992, 11 pages.

Rajeev Kumar et al., Oracle DBA, A Helping Hand, Container Database and Pluggable Database (CDB & PDB), retrieved from the internet on Dec. 4, 2013, 2 pages.

Preimesberger, Chris, "Oracle Profits Up, but Revenues Slip" Oracle, dated Sep. 20, 2012, 2 pages.

Oracle Help Center , "Database 2 Day + Data Replication and Integration Guide", 3 Accessing and Modifying Information in Multiple Databases, dated 2016, 14 pages.

Oracle Base, Multitenant: Create and Configure a Pluggable Database (PDB) in Oracle Database 12c Release 1 (12.1), dated Jan. 8, 2014, 16 pages.

(56) References Cited

OTHER PUBLICATIONS

Muhammad Anwar, "How to Install Oracle 12c Multitenant Pluggable Database", Dated Feb. 24, 2012, 27 pages.
Garcia-Molina et al., "Database System Implementation", dated Jan. 1, 2000, 84 pages.
Francisco Munoz et al., "Oracle Database 12c Backup and Recovery Survival Guide", dated Sep. 24, 2013, 8 pages.
Dominic Betts et al., "Developing Multi-Tenant Applications for the Cloud", 3rd Edition, Microsoft, 2012, 246 pages.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 14 pages.
Zhe, Li, et al., "PERF join: an alternative to two-way semijoin and Bloomjoin" Proceedings of the 1995 ACM, New York. NY, US., 1995, pp. 187-144.
Shao et al., "Clotho: Decoupling Memory Page Layout from Storage Organization", Proceedings of the 30th VLDB Conference, Toronto, Canada, 2004, 12 pages.
Schaffner et al., "A Hybrid Row-Column OLTP Database Architecture for Operational Reporting", dated Aug. 24, 2008, 14 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Oracle Database Administrator's Guide, 11g Release 2 (11.2), Chapter 26, Feb. 2010, 54 pages. http://download.oracle.com/docs/cd/E11882_01/server.112/e10595.pdf.
Oracle Database Administrator's Guide, 10g Release 2 (10.2), Chapter 24, May 2006, 34 pages. http://download.oracle.com/docs/cd/B19306_01/server.102/b14231.pdf.
O'Neil, P., et al., "Multi-table joins through bitmapped join indices", SIGMOD Record, ACM, New York, NY, US, vol. 24, No. 3, Sep. 1, 1995, pp. 8-11, ISSN: 0163-5808.
Nirmesh, Malviya, "Recovery Algorithms for In-Memory OLTP Databases", Master of Science Thesis, dated Jul. 1, 2012, 66 pages.
Loizos, M., et al., "Improving distributed join efficiency with extended bloom filter operations", Advanced Networking and Applications, 2007. AINA '07., 21st international Conf. IEEE, May 1, 2007.
Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.
IBM, "A Scheduling Algorithm for Processing Mutually Exclusive Workloads in a Multi-System Configuration", dated Aug. 19, 2002, IEEE, 3 pages.
Zhang Ho et al., "In-Memory Big Data Management and Processing: A Survery", IEEE Transactions on Knowledge and Data Engineering, vol. 27, No. 7, dated Jul. 31, 2015, 30 pages.
Vishal Sikka et al., "Efficient Transaction Processing in SAP Hana Database", Proceedings of the 2012, International Conference on Management of Data, dated Jan. 31, 2012, 12 pages.
Farber et al., "SAP HANA Database—Data Management for Modern Business Applications", SIGMOD Record, dated Dec. 2011, vol. 40, No. 4, 8 pages.
Khalid Sayood:, "Introduction to data Compression", Morgan Kaufmann Publisher, dated Dec. 1996, 4 pages.
Antoni Cau, et al., "Specifying Fault Tolerance within Stark's Formalism," 1993, IEEE, pp. 392-401.
IBM Corp., "IBM OS/2 Extended Edition Configuration," Feb. 1990, IBM Technical Disclosure Bulletin, vol. 32, No. 9B, pp. 446-451.
Alapati, S., Backing Up Databases. In: Expert Oracle Database 11g Administration, Apress, dated 2009, pp. 1-70.
Oracle, "Oracle Data Guard", Concepts and Administration 12c Release 1 (12.1), dated Nov. 2015, 50 pages.
Oracle, "Oracle Active Data Guard", Real-Time Protection and Availability, Oracle White Paper, dated Oct. 2015, 22 pages.
Oracle, "Maximum Availability Architecture", Oracle Best Practices for High Availability, dated Sep. 2011, 42 pages.
Nadimpalli, Rajeev, "How to Run Two or More Databases in Different Time Zones on the Same Machine", dated May 2002, 7 pages.
Li, U.S. Appl. No. 15/339,525, filed Oct. 31, 2016, Interview Summary, dated Jul. 31, 2019.
Werner Vogels, "Eventually Consistent", CACM, dated Dec. 19, 2007, 4 pages.
V Sikka et al, Efficient Transaction Processing in SAP HANA Database: the End of a Column Store Myth, SIGMOD dated 2012, 11 pages.
Oracle® Flashback Technologies, http://www.oracle.com/technetwork/database/features/availability/flashback-overview-082751.html, last viewed on Dec. 5, 2019, 3 pages.
Oracle® TimesTen In-Memory Database and TimesTen Application-Tier Database Cache, www.oracle.com/technetwork/database/database-technologies/timesten/overview/index.html, viewed on Dec. 5, 2019, 1pg.
Oracle Help Center, Oracle® TimesTen Application-Tier Database Cache User's Guide: Read-only Cache Groups, http://stdoc.us.oracle.com/12/12102/TTCAC/define.htm#TTCAC211, viewed on Dec. 5, 2019, 10 pages.
Ma et al., On benchmarking online social media analytical queries. In First International Workshop on Graph Data Management Experiences and Systems (GRADES '13). ACM, Article, dated 2013, 7 pages.
Labrinidis et al., "Balancing Performance and Data Freshness in Web Database Servers", VLDB dated 2003, 12 pages.
Jeff Erickson, In-Memory Acceleration for the Real-Time Enterprise,http://www.oracle.com/us/corporate/features/database-in-memory-option/index.html, last viewed on Dec. 5, 2019, 4 pages.
Gary Marchionini, Exploratory Search: From Finding to Understanding. Communications. ACM 49, 4, dated Apr. 2006, pp. 41-46.
Oracle® TimesTen In-Memory Database and TimesTen Application-Tier Database Cache, www.oracle.com/technetwork/database/database-technologies/timesten/overview/index.html, viewed on Dec. 5, 2019, 1pg. Oracle Help Center, Oracle® TimesTen Application-Tier Database Cache User's Guide: Read-only Cache Groups, http://stdoc.us.oracle.com/12/12102/TTCAC/define.htm#TTCAC211, viewed on Dec. 5, 2019, 10 pages.
Krishnaswamy, U.S. Appl. No. 15/892,677, filed Feb. 9, 2018, Notice of Allowance, dated Mar. 11, 2020.

* cited by examiner

CONSISTENT QUERY EXECUTION FOR BIG DATA ANALYTICS IN A HYBRID DATABASE

FIELD OF THE INVENTION

The present invention relates to database management systems and in particular, to query execution and change propagation decisions for a heterogeneous database system.

BACKGROUND

Big data analytics is a process for examining large data sets to determine patterns, correlations, trends, and other information. An emerging trend in big data analytic applications is to use a secondary database system to offload large analytic queries from a primary database system, in order to boost query processing performance. The secondary database system may act as a query processing system that does not support all features of a standard database system. For example, the secondary database system may not be able to directly receive database statements or data changes from a client application. Rather, the secondary database system may rely on the primary database system to be ACID (Atomicity, Consistency, Isolation, Durability) compliant, as expected in standard database systems.

The secondary database system may store a copy of data on which queries received at the primary database system execute. Data changes are received and executed on the primary database system. New or updated data must be added to the database of the secondary database system, and deleted data must be removed.

A possible approach for propagating changes to the secondary database is propagating changes on an as-needed, on-demand basis, when data is targeted by a query. Although on-demand propagation may spread out the computing cost of propagating changes, it increases the response time required when executing a query.

Another possible approach is to propagate changes as soon as they are received or committed in the primary database system. This results in a faster query response time compared to on-demand propagation, but results in high overhead for the database system when large amounts of changes are received within a short amount of time by the primary database system.

A third possible approach is to schedule change propagation at specific times or at regular intervals. However, this method does not guarantee that secondary database system will have up-to-date data prior to executing a query in the secondary database system. Thus, this method does not guarantee that a query will produce accurate results.

However, for data analytics queries, such as those performed for big data analytics, data consistency is required in order for a query to produce accurate results. Furthermore, since the goal of using of a secondary system is to increase query execution efficiency, query performance cannot be significantly affected by change propagation. Thus, a method for change propagation that maintains both data consistency and query execution efficiency is required.

Additionally, most systems that use a particular propagation method require users to configure the primary and secondary database system and select a particular change propagation method based on what the user expects the database systems' workload and data change pattern to be. Once the secondary database system is configured, it may be difficult or impossible to switch between different propagation methods if the workload and/or data change pattern is not as expected.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for efficient query processing and data change propagation at a secondary database system. As described above, a secondary database system may be configured to execute queries, or portions of the work of executing the queries, received at a primary database system. Database changes made at the primary database system are selectively copied to the secondary database system.

The primary database system receives a query to be executed on either the primary database system or the secondary database system. The primary database system determines whether to send the query to the secondary database system for execution based upon whether data objects stored within the secondary database system, which are required for execution of the query, have pending changes that need to be applied to the data objects stored within the secondary database system. The pending changes are stored within in-memory journals within the primary database system.

If the data objects have pending changes in the in-memory journals then the primary database system scans for the pending changes to the data objects and sends the pending changes to the secondary database system. The secondary database system then receives and applies the pending changes to the data objects within the secondary database system. Upon applying the pending changes, the secondary database system executes the query.

System Overview

Figure 1:
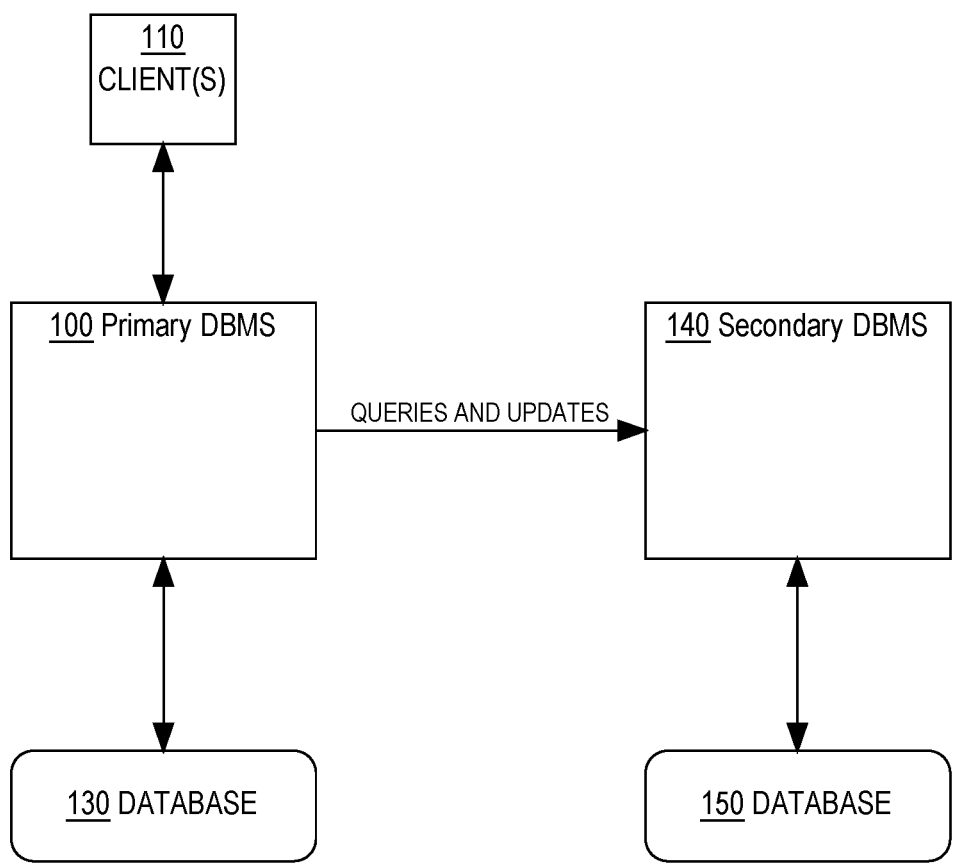
FIG. 1 is a block diagram illustrating an example primary database system and secondary database system.

FIG. 1 illustrates an example primary database management system (DBMS) and an offload DBMS for the primary DBMS. Primary database system 100 comprises one or more database servers that are connected to a database 130. Database 130 may be stored on one or more disks to which the primary database system 100 has access. One or more clients 110 may connect to the primary database system 100. Client 110 may be a client computer system or a client application. Client 110 may submit queries and database changes for database 130 to the primary database system 100.

Primary database system 100 is also connected to a secondary database system 140, which may be an offload database system for the primary database system 100. In an embodiment, a secondary database system 140 is configured to execute queries, or parts of queries, more efficiently than the primary database system 100. The secondary database system 140 is connected to database 150. Database 150 may be stored on one or more disks to which secondary database system 150 has access. Database 150 may store a copy of at least a portion of the data stored in database 130. In an embodiment, database 150 is an asynchronous replica of database 130. As used herein, an asynchronous replica refers to a replica database wherein data may be first written to a primary database and acknowledged as being completed before being copied to a secondary database.

In an embodiment, the secondary database system 140 is not configured to receive and/or handle database queries such as SQL statements from end users. The client 110 does not connect directly to the secondary database system 140, or send queries or changes directly to the secondary database system 140. Rather, queries and data changes from client 110 are received at the primary database system 100. The primary database system 100 determines whether to send any queries for execution, or portions of the work of executing the queries, to the secondary database system 140 for processing. Data changes made to database 130, and then reproduced in or copied to the secondary database system 140 and database 150.

Data Updates

Figure 2:
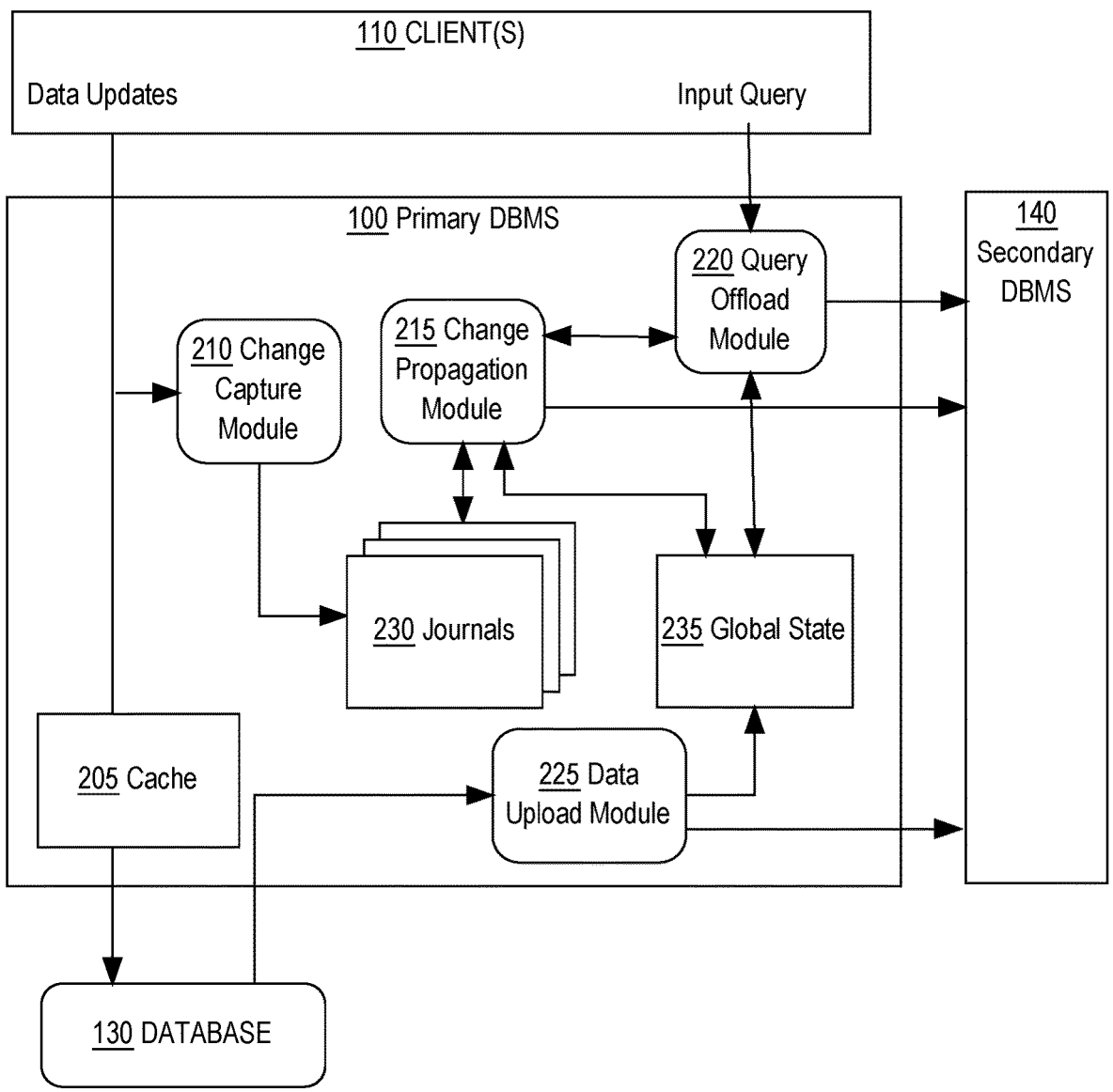
FIG. 2 is a block diagram illustrating example components of the primary database system configured to process data updates and queries.

The primary database system 100 comprises one or more modules configured to receive data updates from client 110 or any other computing device able to update data stored within the primary database system 100, database 130, the secondary database system 140, and database 150. FIG. 2 depicts an detailed embodiment of modules in the primary database system 100 configured to receive and manage data updates and query requests for one or more data objects maintained in the primary data system 100 and the secondary database system 140. In an embodiment, the primary database system 100 contains a change capture module 210, a change propagation module 215, a query offload module 220, and a data upload module 225. Modules described herein comprise software, data, and allocation of one or more processes. The software refers to executable instructions in memory or stored source code that is configured to cause the one or more processes to perform particular functionality.

In an embodiment, the primary database management system 100 receives data updates from client 110 to update one or more data objects within database 130. The primary database management system 100 is configured to route the received data updates to the existing buffer cache 205 in order to update data objects currently loaded within the buffer cache 205. The primary database management system 100 is configured to also send the data updates to database 130 in order to apply the updates to the data objects stored within database 130. In an embodiment, the change capture module 210 is configured to intercept data updates from client 110 and determine whether the data updates contain transaction changes for one or more data objects stored within the secondary database system 140. If transaction changes exist for the one or more data objects stored within the secondary database system 140, then the change capture module 210 is configured to package and send the transaction changes for the one or more data objects to journals 230 stored within the primary database system 100.

In-Memory Journals

In an embodiment, journals 230 represent one or more in-memory journals that contain one or more transaction logs stored in byte addressable RAM within the primary database system 100. The one or more in-memory journals may represent data structures configured to track changes to data objects. For example journals 230 may represent one or more transaction logs that contain uncommitted data changes, committed data changes, and/or both uncommitted and committed data changes for one or more data objects. In an embodiment, each journal within journals 230 may be configured to maintain a transaction log for each data object contained in the secondary database system 140. For instance, one or more journals that make up journals 230 contain data changes that have not yet been synced with the secondary database system 140. The transaction logs within journals 230 may be formatted to store each change transaction for each data object that is maintained in the secondary database system 140. For instance journals 230 may track whether change transactions have been committed to database 130, have yet to be committed to database 130, and whether the change transactions have been uploaded to the secondary database system 140. In an embodiment, journals 230 may be physically partitioned across different memory segments and multiple scans may be performed on different partitions of journals 230.

In an embodiment, journals 230 may contain multiple types of in-memory journals used for different purposes such as, private journals used to store uncommitted changes for each transaction and shared journals used to store committed changes for each table. For example, private journals may be generated and configured to store all uncommitted changes for a particular transaction such as all changes associated with an inserted row, deleted row, or an updated row. Shared journals may be configured such that a single shared journal contains committed changes for all transactions associated with a particular table. In an embodiment, the private journals, within journals 230, may serve as a staging area for transactions, where once a transaction is committed all of the logged rows in the private journals associated with the committed transaction are moved from the private journals to the shared journals. By doing so, the private journals may be configured to allow efficient rollback of uncommitted transactions, thus reducing the processing overhead that may be attached with scanning shared journals for uncommitted transactions to rollback.

Change Propagation

Referring back to FIG. 2, change propagation module 215 is configured to scan journals 230 for data changes to be uploaded the secondary database system 140. In an embodiment, the change propagation module 215 is configured to propagate data changes from the primary database system 100 to the secondary database system 140 by: determining a set of log records from journals 230, converting the set of log records into a format compatible with the secondary database system 140, and sending the formatted set of log records to the secondary database system 140.

The change propagation module 215 may be configured to propagate changes to the secondary database system 140 either periodically or on-demand.

Periodic Change Propagation

In an embodiment, the change propagation module 215 may be configured to periodically initiate a change propagation task that scans for any pending changes in journals 230. If pending changes for data objects stored in the secondary database system 140 are found, then the change propagation module 215 may convert the set of log records for the pending changes into a format compatible with the data format in the secondary database system 140. For example, the secondary database system 140 stores data objects in a particular format, such as columnar format, and log records stored in journals 230 are stored in row-major format. The change propagation module 215 may then transpose the row-major format of the set of log records into a compatible columnar format that may be loaded into the secondary database system 140. The change propagation module 215 may be configured to send the formatted set of log records to the secondary database system 140. The frequency of periodic propagation may be configured based upon several factors including, but not limited to, data change frequency, frequency of on-demand propagation, historical data including the size of the sets of log records previously propagated, and any other change propagation metrics. Further details on configuring change propagation frequency are discussed in the CONFIGURING PROPAGATION FREQUENCY section herein.

Referring back to FIG. 2, the primary database system 100 contains a global state 235 data structure configured to store metadata about the state of data objects maintained in the secondary database system 140. The metadata stored in global state 235 may contain version information, such as a System Change Number (SCN), which is used to track changes reflected in the secondary database system 140 and maintain data consistency within the secondary database system 140. For example, metadata in global state 235 may include SCNs associated with each transaction for each data object maintained in the secondary database system 140.

In an embodiment, the change propagation module 215 is configured to update global state 235 with change transaction information for change data that is uploaded to the secondary database system 140. For example, the change propagation module 215 may run a periodic change propagation task where the change propagation module 215 scans, identifies, and formats a set of log records of data changes to be sent to the secondary database system 140. The change propagation module 215 may update metadata, in global state 235, associated with data objects represented by the set of log records in order to reflect that the data objects in the secondary database system 140 includes the latest data changes sent by the change propagation module 215 to the secondary database system 140.

Propagation On-Demand

In an embodiment, the change propagation module 215 may be configured to propagate changes on-demand to the secondary database system 140 in response to a specific query that requires specific versions of data objects related to the query. For example, if the primary database system 100 receives a specific analytical query that will be performed on the secondary database system 140, then change propagation module 215 may receive a specific on-demand change propagation request to propagate data changes for specific data objects that are the subject of the specific analytical query. The change propagation module 215 may then receive a specific set of data objects that are the subject of the specific analytical query and may scan and retrieve the relevant change data for the specific set of data objects and send the relevant change data to the secondary database system 140. The secondary database system 140 may receive the relevant change data, as well as the specific analytical query, and commit the relevant change data to the data objects maintained in the secondary database system 140 in order to perform the specific analytical query.

On-demand change propagation is triggered by a query request received by a query offload module 220. In an embodiment, the query offload module 220 is configured to receive queries from clients 110 and determine whether the received query should be sent to the secondary database system 140 for processing. If the query offload module 220 determines that the received query should be sent to the secondary database system 140, then the query offload module 220 determines the versions of data objects needed to perform the query and determines whether the secondary database system 140 has the versions of data objects or whether the versions of data objects need to be propagated to the secondary database system 140. Details on determining whether to send a query to the secondary database system 140 and determining whether change data needs to be propagated to the secondary database system 140 are discussed in the QUERY OFFLOADING section herein.

Upon determining that versions of data objects need to be propagated to the secondary database system 140 in order to perform the received query, the query offload module 220 is configured to send a propagation request to the change propagation module 215. In an embodiment, the change propagation module 215 receives the propagation request and the set of data objects, which may include specific versions of data objects that need to be propagated. The versions of data objects may be specified using SCN numbers or any other identifier that is able to identify versions of data objects.

In an embodiment, the change propagation module 215 is configured to scan journals 230 for records of data objects that correspond to the set of data objects received and have SCN versions that are older or match the SCN versions specified in the set of data objects. For example, if object A with an SCN number as 1001 is part of the set of data objects received by the change propagation module 215, then the change propagation module 215 will scan journals 230 for records of data objects that correspond to object A and have change versions with an SCN that is either equal to 1001 or correspond to an older change that needs to be propagated to the secondary database system 140. In an embodiment, journals 230 may contain multiple journals for the data objects that may be each partitioned into different segments. The change propagation module 215 may then analyze header information for each partition to determine where previous scans have left off. For example, header information for each partition of a journal may contain marker information that describes where the last scan of data left off. The change propagation module 215 may pick up scanning where the current markers left off in order to determine change data that needs to be propagated to the secondary database system 140.

The change propagation module 215 may be configured to scan the shared journals, within the journals 215, for matching change data that needs to be propagated to the secondary database system 140. In an embodiment, the change propagation module 215 may be configured to also scan the private journals within the journals 215 for any records matching the data objects and the SCNs specified in the set of data objects. As previously defined, the private journals within journals 230 contain change data from transactions that have not yet been committed. The change data associated with the uncommitted transaction may be required for the requested query and therefore the change propagation module 215 may scan the private journals and may send uncommitted change data to the secondary database system 140 in order to allow the secondary database system 140 to perform the requested query.

In an embodiment, the change propagation module 215 may specifically mark matching records from the private journals as "propagated" such that when the transactions are committed and the records from the private journals are transferred to the public journals, within journals 230, the records reflect that they have already been sent to the secondary database system 140. By doing so, the change propagation module 215 increases the efficiency of propagation by only sending the uncommitted change data to the secondary database system 140 once and thereby conserving database resources and networking traffic by reducing propagation of duplicate records.

In another embodiment, the change propagation module 215 may be configured to mark change data from private journals that is propagated to the secondary database system 140 as "uncommitted" change data. The secondary database system 140 may be configured to apply the uncommitted change data to the data store for the purpose of executing the requested query. Upon completing the requested query, the secondary database system 140 may be configured to remove any change data marked as uncommitted. By doing so, the secondary database system 140 implements a strategy of only storing committed change data, which allows for a more straightforward data management strategy and reduces the amount of computing overhead needed to track uncommitted and committed change data within the secondary database system 140. After removing, the uncommitted change data from the secondary database system 140, the uncommitted change data may be propagated to the secondary database system 140 once again after the change data has been committed and moved to the shared journals within journals 230.

Data Propagation from Stored Database

Data objects may be propagated directly from database 130. In an embodiment, the data upload module 225 may be configured to read data from database 130 and send the data to the secondary database system 140. The data upload module 225 may be used to initially populate data objects into the secondary database system 140 or to add new data objects that are not currently in the secondary database system 140 or currently tracked within journals 230. In an embodiment, the data upload module 225 may be configured to read data objects from database 130, send the data objects to the secondary database system 140, and update metadata in global state 235 corresponding to the data objects read from database 130 and sent to the secondary database system 140. By doing so, global state 235 maintains records of state information of data objects uploaded to the secondary database system 140.

Query Offloading

The primary database system 100 may be configured to determine the most cost efficient solution for queries based upon response time and computing resources. In an embodiment, the query offload module 220 is configured to receive a query request from clients 110 and to determine whether it is more efficient to execute the query on the primary database system 100 or the secondary database system 140. Determining response time and computing resource efficiency may include, but is not limited to: determining which data objects are required for executing query, determining pending data changes that need to be applied to the secondary database system 140 for executing the query, propagating the pending data changes to the secondary database system 140, and execution time for executing the query on the secondary database system 140.

Figure 3:
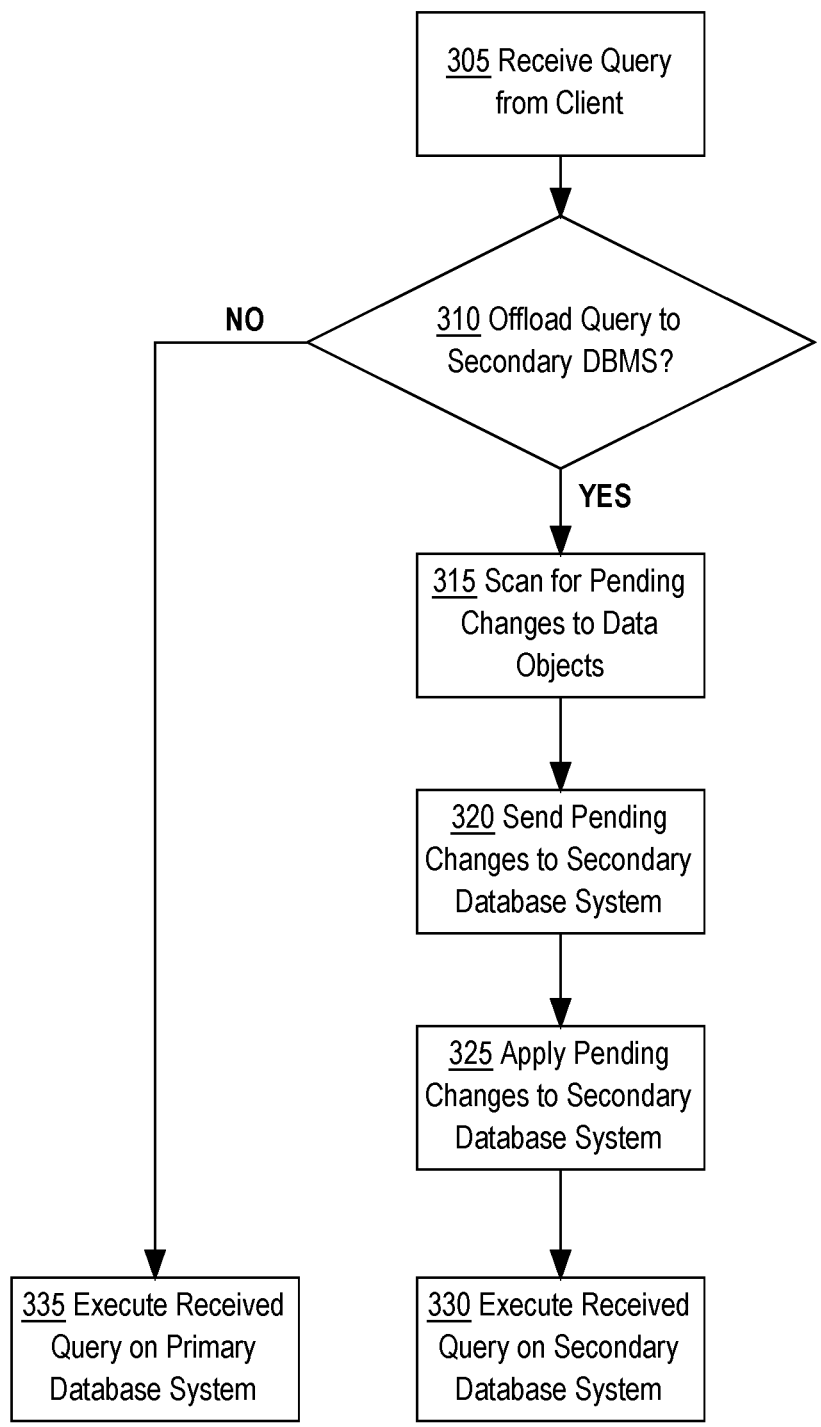
FIG. 3 is an example flowchart for determining whether to offload a query to the secondary database system for execution or to execute the query on the primary database system.

FIG. 3 is an example flowchart for determining whether to offload a query to the secondary database system 140 for execution or to execute the query on the primary database system 100. At step 305, the query offload module 220 receives a query request from clients 110. The query request represents a query to be executed on one or more versions of data objects maintained in the primary database system 100 and/or the secondary database system 140.

At step 310, the query offload module 220 determines whether to offload the query to the secondary database system 140 or whether to execute the query on the primary database system 100. In an embodiment, the query offload module 220 analyzes the query and the query plan required to execute the query including, but not limited to, analyzing the query nodes, the data objects and base relations for each query node, and any intermediary data required for each query node. Based upon the data objects required for the query plan, the query offload module 220 determines an estimated execution time for executing the query on the primary database system 100 and on the secondary database system 140. Determining execution time for the query on the primary database system includes estimating query execution time based upon the query plan and based upon which data objects are currently loaded into the cache 205. For example, if the necessary data objects are currently loaded into the cache 205, then query execution time may be estimated as a relatively short time. However, if one or more data objects are not loaded into the cache 205, then estimated execution time for the primary database system 100 would be significantly longer because data objects need to be retrieved directly from database 130.

Determining execution time for the secondary database system 140 may include, but is not limited to, estimating the amount of pending data changes for data objects that need to be scanned from journals 230, scanning journals 230 for pending data changes, sending the pending data changes from journals 230 to the secondary database system 140, applying the pending data changes to the secondary database system 140, and execution time for executing the query on the secondary database system 140.

In an embodiment, the query offload module 220 is configured to query global state 235 to determine whether there are any pending data changes to the data objects required by the query that need to be propagated to the secondary database system 140. The query offload module 220 determines whether there are pending data changes by checking metadata in global state 235 to determine the current versions of data objects currently available in the secondary database system 140. If the versions of data objects in global state 235 are the same versions or newer versions of data objects required by the query, then the secondary database system 140 does not need to propagate data changes to the secondary database system 140 in order to execute the query. If however, the versions of data objects in global state 235 are older than the versions required for executing the query, then the query offload module 220 may compile a preliminary list of data objects that have pending data changes that need to be propagated to the secondary database system 140.

Based upon the preliminary list of data objects that have pending data changes, the query offload module 220 may estimate the cost for scanning and sending the pending data changes to the secondary database system 140. Since actual cost for scanning and sending pending data changes for specific data objects is dependent on the actual number of pending changes in journals 230 at a specific time, the actual cost cannot be calculated without first determining the cost to scan journals 230. Therefore cost for scanning and sending data changes to the secondary database system 140 is estimated based on historical data of pending data changes that have been propagated during periodic and on-demand data propagation. In an embodiment, historical data used to estimate execution time includes determining the average number of rows for each relevant data object that needs to be propagated and the average cost per row to propagate to the secondary database system. Cost is this instance refers to propagation time to scan journals 230 and send to the secondary database system 140. For example, if the preliminary list of data objects that have pending data changes includes Table A, then the estimated cost for scanning and sending pending data changes associated with Table A is based on an historical average time for scanning and sending pending data changes for Table A.

In other embodiments, different propagation statistics may be used to determine the average propagation time based on average time to synchronize change data to the secondary database system 140. Along with the average propagation time for relevant data objects, average time to send data across the network from the primary database system 100 to the secondary database system 140 and average execution time of the query on the secondary database system 140 is calculated to determine the overall execution cost of executing the query on the secondary database system 140.

The query offload module 220 then determines whether to send the requested query to the secondary database system 140 or to process the requested query on the primary database system 100 based upon the estimated query execution times calculated for the primary database system 100 and secondary database system 140. In an embodiment, the query offload module 220 may determine whether to send the query to the secondary database system 140 based upon additional factors including, but not limited to, the in-memory state of the primary database system 100 and the in-memory state of the secondary database system 140. For example, if the available in-memory, which includes memory allocated for the cache 205 and journals 230, is full then the query offload module 220 may determine not to send the query to the secondary database system 140 because the processing time to scan journals 230 and send the pending data changes to the secondary database system 140 may be greatly increased when the in-memory data is full. Instead the query offload module 220 may be configured to flush journals 230 in order to free up in-memory space on the primary database system 100 and process the query on the primary database system 100 using data objects in the cache 205. In the scenario where the in-memory space on the secondary database system is full, the query offload module 220 may determine to process the query on the primary database system 100 because the cost to execute the query on the secondary database system 140 will be significantly increased as the secondary database system 140 may have to access data from database 150 rather than relying solely on data objects loaded into the secondary database system's 140 buffer.

If at step 310, the query offload module 220 determines that it is more cost effective to send the query to the secondary database system 140, then the query offload module 220 proceeds to step 315, where the change propagation module 215 scans journals 230 for the pending data changes associated with data objects in the preliminary list of data objects. If however, the query offload module 220 determines that it is more cost effective to process the query on the primary database system 100, then the query offload module 220 proceeds to step 335, which depicts the primary database system 100 processing the query using data objects loaded into the cache 205 and, if needed, data objects stored in database 130.

At step 315, the change propagation module 215 scans journals 230 for pending data changes needed for executing the requested query on the secondary database system 140. In an embodiment, the change propagation module 215 receives a request from the query offload module 220 to scan journals 230 for pending change data for data objects associated with the query. The request to scan journals 230 may include the preliminary list data objects required for the query and the version numbers for the data objects. For example, the query offload module 220 may determine that pending change data related to Table A with an SCN of 1001 is required to executed the received query. The query offload module 220 may then send a request, which includes a preliminary list of data objects including Table A with an SCN 1001, to the change propagation module 215. The change propagation module 215 may then scan journals 230 for pending change data that matches data object Table A and version SCN 1001.

In an embodiment, the change propagation module 215 may be configured to determine whether a scan of journals 230 is currently running and if so, allow the current running scan collect the pending change data for sending to the secondary database system 140. If a scan is not currently running, the change propagation module 215 may be configured to initiate a scan of journals 230 for pending change data that matches the data objects and versions of data objects specified in the preliminary list of data objects from the query offload module 220.

At step 320, the change propagation module 215 sends the pending data changes to the secondary database system 140. In an embodiment, after the change propagation module 215 scans and identifies pending change data for data objects, the change propagation module 215 is configured to convert the pending change data, which may be in the form of a set of log records into a format compatible with the secondary database system 140. As described in the CHANGE PROPAGATION section, the change propagation module 215 is configured to the send the converted change data to the secondary database system 140. In an embodiment, the change propagation module 215 may be configured to package the change data and the query into a single message and send the message to the secondary database system 140, such that the secondary database system 140 may receive the query to be executed and the change data to be applied to the data objects prior to executing the received query. In another embodiment, the query offload module 220 may be configured to send to the query directly to the secondary database system 140. In yet other embodiments, the query offload module 220 may coordinate with the change propagation module 215 to send a joint data message or consecutive data messages to the secondary database system 140.

In an embodiment, if during steps 315 and 320 the query offload module 220 may determine that the scanning and sending of change data to the secondary database system 140 exceeds a particular timeout period, then the query offload module 220 may be configured to initiate processing of the query by the primary database system 100. If the query offload module 220 determines that the primary database system 100 should process the query, then the query offload module 220 would proceed to step 335, where the primary database system 100 would process the query. This scenario may occur if the estimated time to scan and send change data takes longer than expected. In order to maintain query efficiency, the query offload module 220 may determine after a particular amount of time that it is more efficient to process the query on the primary database system 100 rather than wait for the change data to be sent to the secondary database system 140 for processing.

At step 325, the secondary database system 140 receives the pending change data and the query to be executed and applies the pending change data to the data objects maintained by the secondary database system 140. In an embodiment, the secondary database system 140 may receive data that includes a query request and pending change data for data objects associated with the query request. The secondary database system 140 may be configured to apply the change data to data objects stored within the cache of the secondary database system 140. Additionally, the secondary database system 140 may send the change data to database 150 to apply the changes to the data objects stored in persistent memory in database 150.

At step 330, the secondary database system 140 executes the received query on the maintained data objects. In an embodiment, the secondary database system 140 is configured to execute the query on the newly updated data objects and send the query result set back to the primary database system 100.

Configuring Propagation Frequency

Frequency of change propagation may affect the performance of the primary database system 100 and the secondary database system 140 with respect to executing queries and other operation overhead. For example, if the frequency of change propagation is too high, then it may lead to less on-demand propagations when query requests are received by the query offload module 220. This may lead to faster turnaround times for processing queries on the secondary database system 140 since the steps of scanning and sending change data from journals 230 is not needed, however the increased frequency of scheduled change propagations will cause larger processing overhead on the primary database system 100. Conversely, if the frequency of change propagation is too low, then on-demand change propagations in response to receiving query requests may result in an increased volume of change data identified in journals 230. The increased volume of change data in journals 230 during on-demand propagation may result in longer scanning and propagation times to the secondary database system 140, thus resulting in longer execution times for queries executed on the secondary database system 140.

In an embodiment, the change propagation module 215 may be configured with an auto-tuning change propagation scheduler that automatically adjusts the change propagation frequency according to historical change data statistics. The change propagation module 215 may be configured with multiple scheduling parameters including, but not limited to: a change propagation default frequency, a change propagation delta that represents the average volume of change data of past propagations, a configured upper and lower delta threshold, and a delta of frequency that defines a delta value to modify the change propagation frequency. For example, if the delta of frequency is set to 10 minutes, then the delta of frequency may be used to either increase the frequency of the change propagation tasks by reducing the time between each task by 10 minutes. Additionally, the delta of frequency may be used to decrease the frequency of the change propagation tasks by increasing the time between each task by 10 minutes.

In an embodiment, the change propagation module 215 may be configured to start up with a change propagation task frequency equal to the change propagation default frequency. For example, if the change propagation default frequency is set to initiate change propagation tasks on an hourly basis then the change propagation module 215 would start up and schedule change propagation tasks to run once every 60 minutes. The change propagation module 215 may be configured to track the volume of change data propagated during each change propagation task. For example, the change propagation module 215 may record the volume of change data in terms of the number of log records propagated during each propagation task. The change propagation module 215 may be configured to calculate an historical average of change data volume for the configured number of change propagation tasks. For example, the change propagation module 215 may record and calculate an average historical change propagation volume based on the previous three change propagation tasks as 1500 log records per task. In an embodiment, the average historical change propagation volume may be based on a configurable number of change propagation tasks. By making the historical average configurable, the change propagation module 215 may avoid any anomalies that may result in a temporary increase or decrease of data changes to data objects.

The change propagation module 215 may be configured with an upper and lower delta threshold, for example, the upper delta threshold may be configured as 1200 log records per task and the lower delta threshold may be configured as 600 log records per task. If after calculating the average historical change propagation volume, the change propagation module 215 determines that the average historical change propagation volume exceeds either the upper or lower delta threshold, then the change propagation module 215 may adjust the frequency of change propagation tasks by either increasing or decreasing the frequency by the configured delta of frequency. Using the previous example, if the average historical change propagation volume is calculated as 1500 log records per task and the upper delta threshold is 1200 log records per task, then the change propagation module 215 may increase the current change propagation task frequency (one task every 60 minutes) by the delta of frequency (10 minutes), which may result in a new current change propagation frequency of one task every 50 minutes. In another example, if the average historical change propagation volume is calculated as 500 log records per task and the lower delta threshold is 600 log records per task, then the change propagation module 215 may decrease the current change propagation task frequency (one task every 60 minutes) by the delta of frequency (10 minutes), which may result in a new current change propagation frequency of one task every 70 minutes.

In an embodiment, the parameters for adjusting the change propagation frequency may be configurable in order to adapt to the nature of updates received by the primary database system 100. For example if changes in frequency variation is steady, then it may be desirable to adjust change propagation frequencies quickly in order to react to the changes. This may be accomplished by configuring a narrower range of acceptable change volumes between the lower and upper delta thresholds. If however, variations in change volume is more transient, then slow reaction to the changes may be desired, which may be accomplished by configuring a wider range of acceptable change volumes between the lower and upper delta thresholds.

In an embodiment, the change propagation module 215 may be configured to suspend scheduling change propagation tasks on specific data objects that may only receive sporadic updates. For example, data object table X may be updated at such a low frequency that it is more efficient to allow on-demand updates for data changes to table X. In this scenario, the change propagation module 215 may be configured to only perform on-demand updates for data changes within table X. By doing so, the change propagation module 215 may reduce unnecessary overhead associated with scanning for data changes to data objects that generally remain static and still account for specific data changes by only scanning for needed data changes to specific tables during an on-demand change propagation request.

DBMS Overview

Embodiments of the present invention are used in context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more database containers. Each container contains records. The data within each record is organized into one or more fields. In relational DBMSs, the data containers are referred to as tables, the records are referred to as rows, and the fields are referred to as columns. In object-oriented database, the data containers are referred to as object classes, the records are referred to as objects, and the fields are referred to as attributes. Other database architectures may use other terminology.

A database block, also referred to as a data block, is a unit of persistent storage. A database block is used by a database server to store database records (e.g., to store rows of a table, to store column values of a column). When records are read from persistent storage, a database block containing the record is copied into a database block buffer in RAM memory of a database server. A database block usually contains multiple rows, and control and formatting information (e.g., offsets to sequences of bytes representing rows or other data structures, list of transactions affecting a row). A database block may be referenced by a database block address.

A multi-node database management system is made up of interconnected nodes that share access to the same database or databases. Typically the nodes are interconnected via a network and share access, in varying degrees, to shared storage, e.g. shared access to a set of disk drives and data blocks stored thereon. The nodes in the multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system may host a database server. A server, such as a database server, is a combination of integrated software components and an allocation of computational resources, such as memory, a node, and processes on the node for executing the integrated software components on a processor, the combination of the software and computation resources being dedicated to performing a particular function on behalf of one or more clients.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
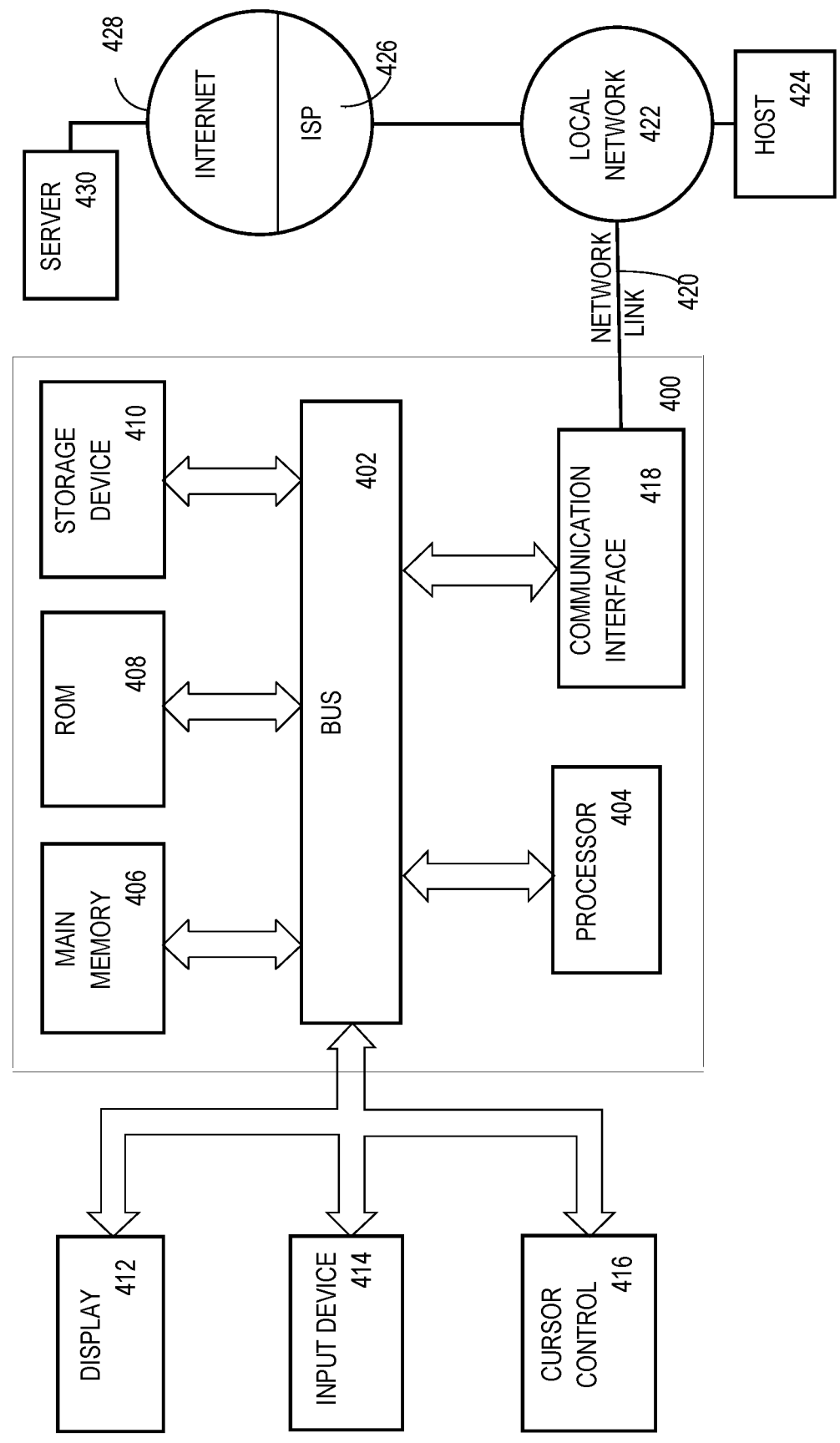
FIG. 4 is a block diagram illustrating a computer system that may be used to implement the techniques described herein.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a query at a primary database management system (DBMS) comprising a primary database, an offload DBMS, and an offload database replica accessed by the offload DBMS to calculate query operations requested by the primary DBMS, the offload database replica being an asynchronous replica of at least a portion of the primary database that stores said at least a portion of the primary database in columnar form;
determining whether to send the query to the offload DBMS for execution based upon whether one or more data objects stored within the offload database replica, for which access is required by execution of the query, have one or more pending changes stored in one or more in-memory journals;
wherein the one or more in-memory journals are data structures that contain changes that occurred within the primary database to data objects that are stored in row form within said primary database, wherein said changes are to be applied to replicated data objects that are stored in said columnar form within the offload database replica;

if the one or more data objects have the one or more pending changes, then:
scanning for the one or more pending changes to the one or more data objects, for which access is required by execution of the query, in the one or more in-memory journals;
sending query data comprising the one or more pending changes to the offload DBMS;
the offload DBMS receiving and applying the query data to the replicated data objects associated with the one or more data objects; and
in response to applying the one or more pending changes to the replicated data objects, the offload DBMS executing the query.

2. The method of claim 1, further comprising in response to receiving the query at the primary DBMS, parsing the query at the primary DBMS to determine the one or more data objects for which access is required by execution of the query.

3. The method of claim 1, wherein the primary DBMS maintains an offload state data structure, which contains replication metadata defining current offload state of replicated data objects stored in the offload database replica.

4. The method of claim 3, wherein determining whether one or more data objects stored within the offload database replica have one or more pending changes further comprises scanning the replication metadata maintained in the primary DBMS.

5. The method of claim 1, wherein the one or more in-memory structures comprise at least one of:
an in-memory shared journal that maintains committed changes for the data objects from the primary database, and
an in-memory private journal that maintains uncommitted changes for the data objects from the primary database.

6. The method of claim 5, further comprising if a particular uncommitted change of the uncommitted changes maintained in the in-memory private journal becomes a committed change at the primary database, then transferring the particular uncommitted change from the in-memory private journal to the in-memory shared journal.

7. The method of claim 5, further comprising:
at configured time intervals the primary DBMS, sending the committed changes for the data objects maintained in the in-memory shared journal to the offload DBMS; and
the offload DBMS, applying the committed changes for the data objects to the offload database replica.

8. The method of claim 7, wherein the time intervals are configurable based upon a historical average volume of committed changes for the data objects that have previously been sent to the offload DBMS.

9. The method of claim 8, wherein the time intervals are decreased by a specific interval amount if the historical average volume of committed changes for the data objects that have previously been sent to the offload DBMS exceeds a configured upper threshold of volume of committed changes for the data objects.

10. The method of claim 8, wherein the time intervals are increased by a specific interval amount if the historical average volume of committed changes for the data objects that have previously been sent to the offload DBMS does not exceed a configured lower threshold of volume of committed changes for the data objects.

11. One or more non-transitory computer-readable media storing instructions which, when executed by one or more hardware processors, cause:

receiving a query at a primary database management system (DBMS) comprising a primary database, an offload DBMS, and an offload database replica accessed by the offload DBMS to calculate query operations requested by the primary DBMS, the offload database replica being an asynchronous replica of at least a portion of the primary database that stores said at least a portion of the primary database in columnar form;
determining whether to send the query to the offload DBMS for execution based upon whether one or more data objects stored within the offload database replica, for which access is required by execution of the query, have one or more pending changes stored in one or more in-memory journals;
wherein the one or more in-memory journals are data structures that contain changes that occurred within the primary database to data objects that are stored in row form within said primary database, wherein said changes are to be applied to replicated data objects that are stored in said columnar form within the offload database replica;
if the one or more data objects have the one or more pending changes, then:
scanning for the one or more pending changes to the one or more data objects, for which access is required by execution of the query, in the one or more in-memory journals;
sending query data comprising the one or more pending changes to the offload DBMS;
the offload DBMS receiving and applying the query data to the replicated data objects associated with the one or more data objects; and
in response to applying the one or more pending changes to the replicated data objects, the offload DBMS executing the query.

12. The one or more non-transitory computer-readable media of claim 11, wherein the instructions include instructions that, when executed by the one or more processors, further cause in response to receiving the query at the primary DBMS, parsing the query at the primary DBMS to determine the one or more data objects for which access is required by execution of the query.

13. The one or more non-transitory computer-readable media of claim 11, wherein the primary DBMS maintains an offload state data structure, which contains replication metadata defining current offload state of replicated data objects stored in the offload database replica.

14. The one or more non-transitory computer-readable media of claim 13, wherein determining whether one or more data objects stored within the offload database replica have one or more pending changes further comprises scanning the replication metadata maintained in the primary DBMS.

15. The one or more non-transitory computer-readable media of claim 11, wherein the one or more in-memory structures comprise at least one of:
an in-memory shared journal that maintains committed changes for the data objects from the primary database, and
an in-memory private journal that maintains uncommitted changes for the data objects from the primary database.

16. The one or more non-transitory computer-readable media of claim 15, wherein the instructions include instructions that, when executed by the one or more processors, further cause if a particular uncommitted change of the uncommitted changes maintained in the in-memory private journal becomes a committed change at the primary database, then transferring the particular uncommitted change from the in-memory private journal to the in-memory shared journal.

17. The one or more non-transitory computer-readable media of claim 15, wherein the instructions include instructions that, when executed by the one or more processors, further cause:

at configured time intervals the primary DBMS, sending the committed changes for the data objects maintained in the in-memory shared journal to the offload DBMS; and the offload DBMS, applying the committed changes for the data objects to the offload database replica.

18. The one or more non-transitory computer-readable media of claim 17, wherein the time intervals are configurable based upon a historical average volume of committed changes for the data objects that have previously been sent to the offload DBMS.

19. The one or more non-transitory computer-readable media of claim 18, wherein the time intervals are decreased by a specific interval amount if the historical average volume of committed changes for the data objects that have previously been sent to the offload DBMS exceeds a configured upper threshold of volume of committed changes for the data objects.

20. The one or more non-transitory computer-readable media of claim 18, wherein the time intervals are increased by a specific interval amount if the historical average volume of committed changes for the data objects that have previously been sent to the offload DBMS does not exceed a configured lower threshold of volume of committed changes for the data objects.

* * * * *